United States Patent
Koshimichi

(10) Patent No.: US 9,205,731 B2
(45) Date of Patent: Dec. 8, 2015

(54) SUNROOF APPARATUS

(71) Applicant: Nishikawa Rubber Co., Ltd., Hiroshima (JP)

(72) Inventor: Masaru Koshimichi, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 0 days.

(21) Appl. No.: 14/581,346

(22) Filed: Dec. 23, 2014

(65) Prior Publication Data

US 2015/0183309 A1 Jul. 2, 2015

(30) Foreign Application Priority Data

Dec. 26, 2013 (JP) ................... 2013-269245

(51) Int. Cl.
*B60J 10/12* (2006.01)
*B60J 10/00* (2006.01)
*B60J 10/10* (2006.01)

(52) U.S. Cl.
CPC .......... *B60J 10/0091* (2013.01); *B60J 10/0017* (2013.01); *B60J 10/10* (2013.01)

(58) Field of Classification Search
CPC ......... B60J 10/10; B60J 10/0091; B60J 7/043

USPC ............................................ 296/93; 49/482.1
See application file for complete search history.

(56) References Cited

U.S. PATENT DOCUMENTS 8,152,229 B2 * 4/2012 Horiuchi .................. B60J 10/12
 296/216.09
2010/0096889 A1 4/2010 Horiuchi et al.

FOREIGN PATENT DOCUMENTS

JP 2004-114924 A 4/2004
JP 2010-095129 A 4/2010

* cited by examiner

*Primary Examiner* — Dennis H Pedder
(74) *Attorney, Agent, or Firm* — Alston & Bird LLP

(57) ABSTRACT

A weatherstrip 31 provided to a front panel is hollow and extends on all of a peripheral edge of a panel frame 21 of the front panel 11. A panel frame 22 of a rear panel 12 has a portion which faces the front panel 11 and on which a weatherstrip 32 is absent. When the front panel 11 and the rear panel 12 have closed an opening 3, the weatherstrip 31 is in contact with the panel frame 22. A corner portion 213 of the panel frame 21 has an engagement portion 28 projecting outward. A corner portion 313 of the weatherstrip 31 has a recess 38 with which the engagement portion 28 is engaged.

5 Claims, 7 Drawing Sheets

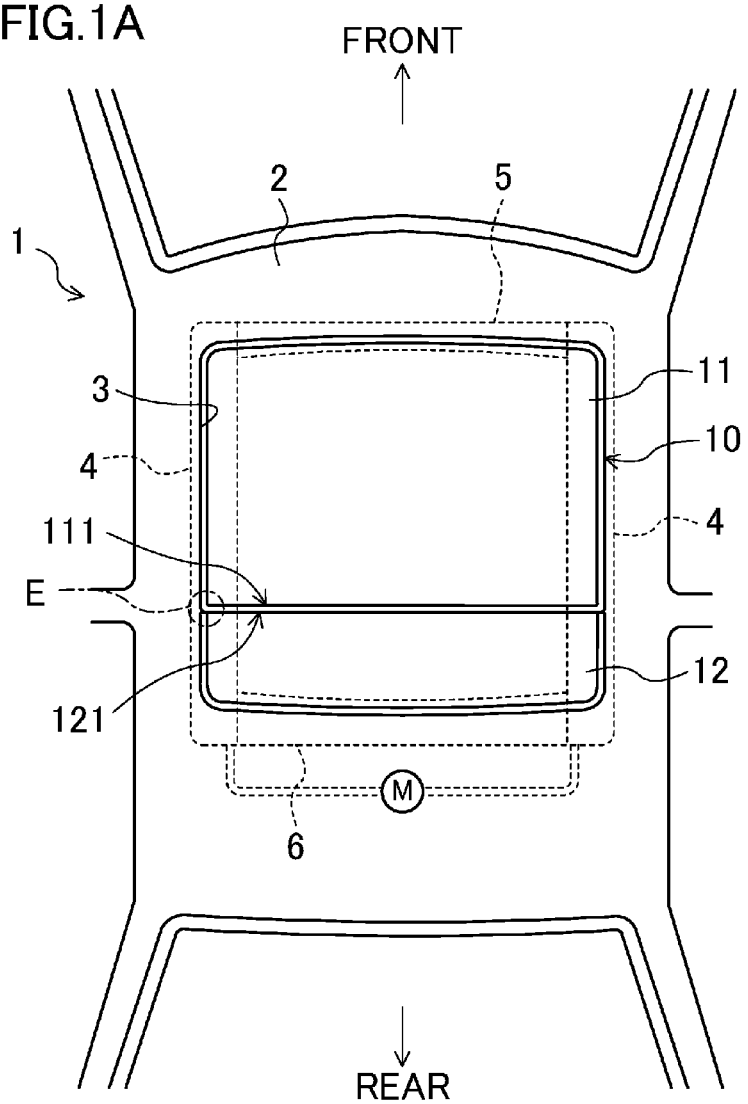
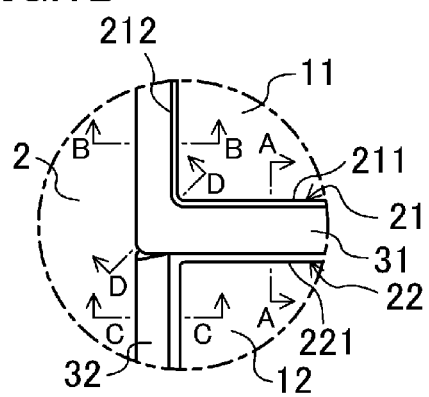

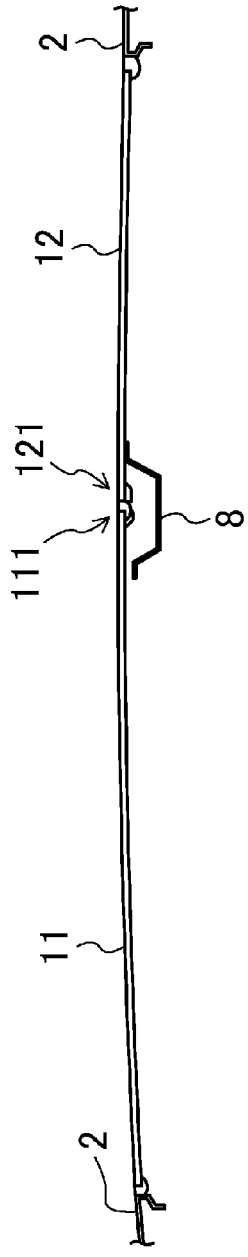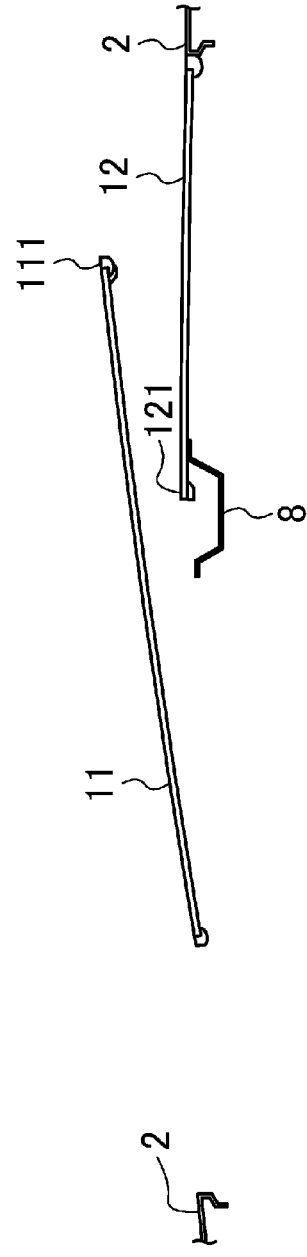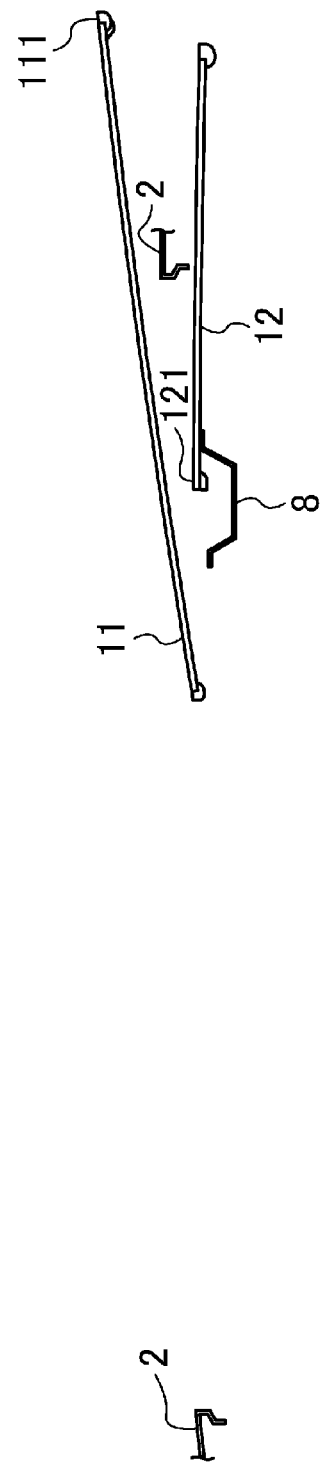

SUNROOF APPARATUS

CROSS-REFERENCE TO RELATED APPLICATION

This application claims priority to Japanese Patent Application No. 2013-269245 filed on Dec. 26, 2013, the entire disclosure of which is incorporated by reference herein.

BACKGROUND

The techniques disclosed herein relate to vehicle sunroof apparatuses including a front panel and a rear panel configured to close an opening in a fixed roof. In particular, the techniques relate to a vehicle sunroof apparatus configured such that at least one of the front panel or the rear panel is retractable and the opening of the fixed roof is closed with an edge portion of the front panel being in contact with an edge portion of the rear panel.

A vehicle sunroof apparatus including a front panel and a rear panel which are configured to close an opening in a fixed roof with an edge portion of the font panel and an edge portion of the rear panel facing and contacting each other is known from Japanese Unexamined Patent Publication No. 2004-114924 (Patent Document 1). This patent document discloses a configuration in which the opening is closed with weatherstrips of the panels being in contact with each other. The weatherstrip of the front panel has a hollow structure whereas the weatherstrip of the rear panel has a solid structure, thereby enhancing sealing between the weatherstrips. In this specification, unless otherwise specified, the term "hollow" means a "hollow structure," and not a "hollow material." Likewise, the term "solid" means a "solid structure," and not a "solid material."

Japanese Unexamined Patent Publication No. 2010-095129 (Patent Document 2) discloses a sunroof apparatus configured such that an opening in a fixed roof is closed with an edge portion of a front panel being in contact with an edge portion of a rear panel. In this sunroof apparatus, the edge portion of the front panel is provided with a hollow weatherstrip and the edge portion of the rear panel is provided with a solid frame. The weatherstrip and the frame are caused to contact each other when the opening in the fixed roof is closed.

SUMMARY

In the sunroof apparatus of Cited Reference 2, the weatherstrip that is hollow and likely to be deformed extends along the entire periphery of the front panel. Therefore, misalignment and displacement are likely to occur when the weatherstrip is attached and used. In particular, misalignment and displacement of a corner portion mar the appearance of the weatherstrip.

The techniques disclosed herein reduce misalignment and displacement of a weatherstrip which can occur when the weatherstrip is attached or used.

The techniques disclosed herein relate to vehicle sunroof apparatus including a front panel and a rear panel configured to contact each other at edge portions of the panels to close an opening in a fixed roof. The front panel includes a panel body, a panel frame extending on a peripheral edge of the panel body, and a weatherstrip extending on the panel frame. The rear panel includes a panel body, a panel frame extending on a peripheral edge of the panel body, and a weatherstrip extending on the panel frame. The weatherstrip of one of the front and rear panels is hollow and extends on all of a peripheral edge of the corresponding panel frame. The panel frame of the other one of the front and rear panels has a portion which faces the one of the front and rear panels and on which the weatherstrip is absent. When the front panel and the rear panel have closed the opening, the weatherstrip of the one of the front and rear panels is in contact with the panel frame of the other one of the front and rear panels. A corner portion of the panel frame of the one of the front and rear panels has an engagement portion projecting outward. A corner portion of the weatherstrip of the one of the front and rear panels corresponds to the corner portion of the panel frame and has a recess with which the engagement portion is engaged.

According to the sunroof apparatus, in the one of the front and rear panels, displacement and misalignment of the weatherstrip relative to the panel frame can be reduced.

BRIEF DESCRIPTION OF THE DRAWINGS

FIG. 1A is a plan view of a sunroof apparatus. FIG. 1B is an enlarged view of portion E surrounded by the dot-dash line in FIG. 1A.

FIGS. 2A-2C illustrate how the sunroof apparatus operates. FIG. 2A illustrates a state where a front panel and a rear panel has closed an opening. FIG. 2B illustrate an initial state of process of opening the opening. FIG. 2C illustrates a state in a latter part of the process of opening the opening.

DETAILED DESCRIPTION

Figure 3:
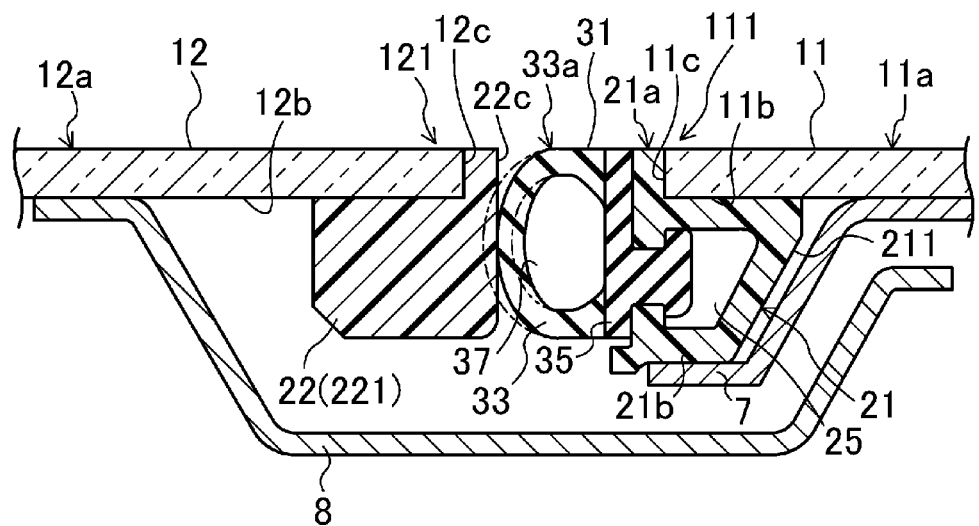
FIG. 3 is a cross-sectional view taken along the line A-A of FIG. 1B.

Embodiments of the present disclosure will be described in detail hereinafter with reference to the drawings. Unnecessarily detailed description may be omitted herein. For example, details of well-known features and techniques and repetitive description of substantially the same configuration may be omitted. This omission is to avoid unnecessarily redundant description and to facilitate the understanding of the person in the art.

The inventor of the present disclosure provides the attached drawings and the following description in order to allow the person in the art to fully understand the present disclosure, and does not intend to limit the scope of the subject matter described in the claims by the drawings and the description.

FIG. 1A is a plan view of a sunroof apparatus. The sunroof apparatus 10 has the so-called twin panel structure. The sunroof apparatus 10 includes a front panel 11 and a rear panel 12 which are retractable and attached to an opening 3 in a fixed roof 2 of a vehicle 1. The front panel 11 is located near the front of the vehicle, and the rear panel 12 is located near the rear of the vehicle. Each of the front panel 11 and the rear panel 12 is in a substantially rectangular shape. In a state where the opening 3 is closed with the front panel 11 and the rear panel 12, a rear edge portion 111 of the front panel 11 and a front edge portion 121 of the rear panel 12 face and contact each other.

Here, the state where the rear edge portion 111 and the front edge portion 121 face and contact each other is not limited to a state where a panel body of the front panel 11 and a panel body of the rear panel 12 face and contact each other. Specifically, an edge of each of the panel bodies may be provided with a frame or a weatherstrip, and the frame or the weatherstrip, instead of an edge of the corresponding panel body, may form the rear edge portion 111 and/or the front edge portion 121. For example, as will be detailed later, the rear edge portion 111 may be formed by a weatherstrip 31, and the front edge portion 121 may be formed by a frame 22. In such a case, the weatherstrip 31 and the weatherstrip 32 face and contact each other.

A pair of side frames 4, a front frame 5, and a rear frame 6 are provided along the periphery of the opening 3. The side frames 4, the front frame 5, the rear frame 6 are located on the lower surface of the fixed roof 2. The side frames 4 are provided with slide mechanisms (not shown) for the front panel 11 and the rear panel 12. A motor M which is a drive source drives the slide mechanisms, thereby moving the front panel 11 and the rear panel 12 to open or close the opening 3.

FIGS. 2A-2C are side views illustrating how the sunroof apparatus operates. FIG. 2A illustrates a state where the front panel 11 and the rear panel 12 have closed the opening 3. FIG. 2B illustrate an initial state of process of opening the opening 3. FIG. 2C illustrates a state of a latter part of the process of opening the opening 3. The sunroof apparatus 10 is configured such that the opening 3 is opened or closed by causing both of the front panel 11 and the rear panel 12 to slide. The front panel 11 is configured to be tilted up to slide whereas the rear panel 12 is configured to be tilted down to slide.

As illustrated in FIG. 2A, in the state where the opening 3 is closed with the front panel 11 and the rear panel 12, the rear edge portion 111 of the front panel 11 faces and contacts the front edge portion 121 of the rear panel 12. To open the opening 3, only the front panel 11 first slides rearward, as illustrated in FIG. 2B. At this time, the front panel 11 has been tilted up. Subsequently, as illustrated in FIG. 2C, when the front panel 11 is sliding toward the rear, the rear panel 12 is tilted down and begins sliding toward the rear. Both of the front panel 11 and the rear panel 12 then slide toward the rear, and eventually, the opening 3 becomes fully opened.

Figure 4:
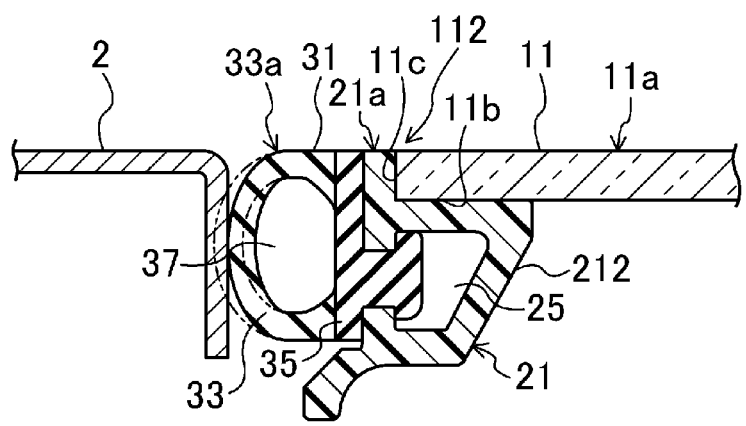
FIG. 4 is a cross-sectional view taken along the line B-B of the FIG. 1B.
Figure 5:
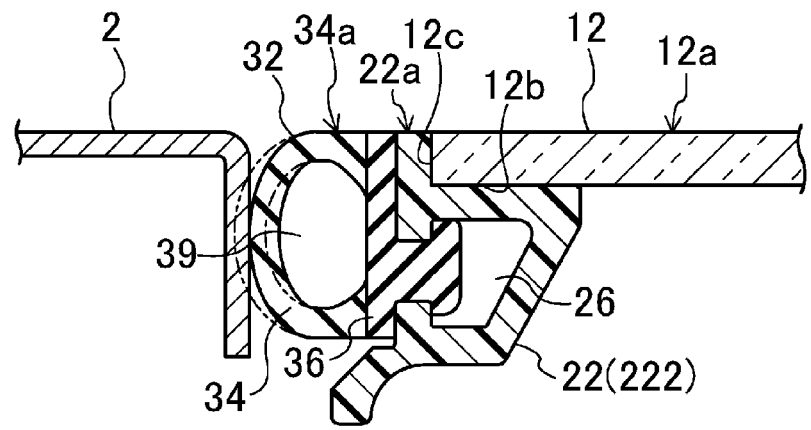
FIG. 5 is a cross-sectional view taken along the line C-C of the FIG. 1B.
Figure 6:
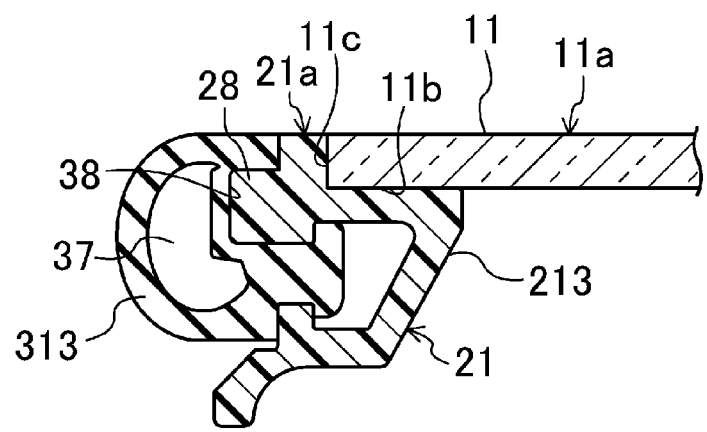
FIG. 6 is a cross-sectional view taken along the line D-D of the FIG. 1B.

FIG. 3 is a cross-sectional view taken along the line A-A of FIG. 1B. FIG. 4 is a cross-sectional view taken along the line B-B of the FIG. 1B. FIG. 5 is a cross-sectional view taken along the line C-C of the FIG. 1B. FIG. 6 is a cross-sectional view taken along the line D-D of the FIG. 1B.

The front panel 11 includes the panel body, a panel frame 21 extending on peripheral edges of the panel body, and the weatherstrip 31 extending on peripheral edges of the panel frame 21. The rear panel 12 includes the panel body, the panel frame 22 extending on peripheral edges of the panel body, and a weatherstrip 32 extending on peripheral edges of the panel frame 22.

The panel body of each of the front panel 11 and the rear panel 12 is in a substantially rectangular shape, and is made of, e.g., glass. Examples of a material for the panel body of each of the front panel 11 and the rear panel 12 include, in addition to glass, a rigid resin such an acrylic resin and a polycarbonate resin, and a steel sheet. A drain frame 8 is mounted on a lower surface 12b of the panel body of the rear panel 12. The drain receiver 8 is configured to receive water dripping from a gap between the panels when the panels are in operation.

The panel frame 21 extends on the entire periphery of the panel body of the front panel 11. The panel frame 22 extends on the entire periphery of the panel body of the rear panel 12. Each of the panel frames 21 and 22 is made of a rigid resin material, e.g., a thermoplastic elastomer styrene (TPS). Examples of a material for each of the panel frames 21 and 22 include, in addition to the TPS, a thermoplastic elastomer olefin (TPO), a thermoplastic elastomer polyester (TPEE), a thermoplastic elastomer polyurethane (TPU), polyvinyl chloride (PVC), a thermoplastic elastomer polyamide, and fluorocarbon rubber. When the panel body of each of the front panel 11 and the rear panel 12 is made of glass, the TPS or the TPO is preferably used as the material for each of the panel frames 21 and 22. This is because these materials impose a light burden on the environment and have high scratch resistance and high adhesiveness to glass. Taking into account also fluidity at high temperature during molding steps, the TPS is more preferable.

The weatherstrip 31 extends on the entire periphery of the panel frame 21 (i.e., around the entire periphery of the panel body). The weatherstrip 32 extends on the peripheral edges except the front edge of the panel frame 21 (i.e., the weatherstrip 32 does not extend along the front edge of the panel body). A material for each of the weatherstrips 31 and 32 will be described later.

Specifically, as illustrated in FIG. 3, a rear portion 211 of the panel frame 21 is bonded to a lower surface 11b and an end surface 11c of the front panel 11 with an adhesive (a primer). A portion of an upper surface 21a of the panel frame 21 corresponding to the rear portion 211 is substantially flush with an upper surface 11a of the front panel 11 (i.e. the upper surfaces 21a and 11a form a flush surface). As illustrated in FIG. 4, side portions 212 of the panel frame 21 are bonded to the lower surface 11b and the end surface 11c of the front panel 11 with an adhesive. Portions of the upper surface 21a of the panel frame 21 corresponding to the side portions 212 are substantially flush with the upper surface 11a of the front panel 11. The panel frame 21 has a fitting groove 25 which opens outward, i.e., toward the weatherstrip 31. The weatherstrip 31 is attached to panel frame 21 via the fitting groove 25. The panel frame 21 has a bottom portion 21b which defines part of the fitting groove 25. The bottom portion 21b is supported by a holder 7 mounted on the lower surface 11b of the front panel 11.

As illustrated in FIG. 3, a front portion 221 of the panel frame 22 is bonded to the lower surface 12b and an end surface 12c of the rear panel 12 with an adhesive. A portion of an upper surface 22a of the panel frame 22 corresponding to the front portion 221 is substantially flush with an upper surface 12a of the rear panel 12. As illustrated in FIG. 5, side portions 222 of the panel frame 22 are bonded to the lower surface 12b and the end surface 12c of the rear panel 12 with an adhesive. Portions of the upper surface 22a of the panel frame 22 corresponding to the side portions 222 are substantially flush with the upper surface 12a of the rear panel 12. The side portions 222 have a fitting groove 26 which opens outward, i.e., toward the weatherstrip 32. The weatherstrip 32 is attached to the panel frame 22 via the fitting groove 26.

Each of the panel frames 21 and 22 is formed by, e.g., outsert molding. The panel frames 21 and 22 are integral with the panel body of the front panel 11 and the panel body of the rear panel 12, respectively. Examples of the outsert molding include injection molding and extrusion molding.

The adhesive for bonding each of the panel frames 21 and 22 to the corresponding panel body is not particularly limited. For example, when the panel bodies of the front panel 11 and the rear panel 12 are made of glass and the panel frames 21 and 22 are made of the TPS, it is suitable to use an olefin-based adhesive having strong adhesiveness between glass materials and the TPS.

As illustrated in FIGS. 3 and 4, the weatherstrip 31 has a sealing portion 33 which is configured to contact the fixed roof 2 (see FIG. 1A) and the rear panel 12, and an engagement portion 35 which is configured to engage with the fitting groove 25. In the weatherstrip 31, the sealing portion 33 and a portion of the engagement portion 35 form a hollow elastic portion 37 which has a hollow cross section. In a state where the weatherstrip 31 has been attached to the panel frame 21, an upper surface 33a of the sealing portion 33 is substantially flush with the upper surface 21a of the panel frame 21, and thus, the entire upper surface of the front panel 11 is substantially flush. The sealing portion 33 is made of a soft synthetic rubber material (e.g., a sponge material). The engagement portion 35 is made of a synthetic rubber material (e.g., a solid EPDM material) harder than the material for the sealing portion 33. The sealing portion 33 and the engagement portion 35 are molded by, e.g., co-extrusion molding and integral with each other. The weatherstrip 31 includes a rear portion 311 and side portions 312 which each include the extrusion molded portions and have the same cross-sectional shape. The sealing portion 33 and the engagement portion 35 may be made of the same material. The rear portion 311 is an example of a first linear portion, and the side portion 312 is an example of a second linear portion.

As illustrated in FIG. 5, the weatherstrip 32 has a sealing portion 34 which is configured to contact the fixed roof 2 (see FIG. 1A) and an engagement portion 36 which is configured to engage with the fitting groove 26. In the weatherstrip 32, the sealing portion 34 and a portion of the engagement portion 36 form a hollow elastic portion 39 which has a hollow cross section. In a state where the weatherstrip 32 has been attached to the panel frame 22, an upper surface 34a of the sealing portion 34 is substantially flush with the upper surface 22a of the panel frame 22, and thus, the entire upper surfaces of the rear panel 12 is substantially flush.

As illustrated in FIG. 6, the panel frame 21 has corner portions 213 which are joint portions between the rear portion 211 and the side portions 212. Each corner portion 213 has an engagement portion 28 which projects outward and is integral with the corner portion 213. The engagement portion 28 extends obliquely with respect to the rear portion 211 and the corresponding side portion 212 (see FIG. 9). More specifically, an angle formed by the engagement portion 28 and the rear portion 211 is substantially equal to an angle formed by the engagement portion 28 and the corresponding side portion 212. On the other hand, the weatherstrip 31 has corner portions 313 which are joint portions between the rear portion 311 and the side portions 312. Each corner portion 313 has a recess 38 with which the engagement portion 28 is engaged. FIG. 6 illustrates the corner portion 213 and the corner portion 313 which are located on the left side in FIG. 1A. Each of the panel frame 21 and the weatherstrip 31 is bilaterally symmetrical, and the corner portion 213 and the corner portion 313 on the right side have the same structures as those illustrated in FIG. 6.

To attach the weatherstrip 31 to the panel frame 21, the engagement portions 28 are engaged with the recesses 38. This engagement reduces displacement and misalignment of the corner portions 313 of the weatherstrip 31 relative to the corner portions 213 of the panel frame 21 in the front-and-rear direction and the lateral direction of the vehicle.

Figure 7:
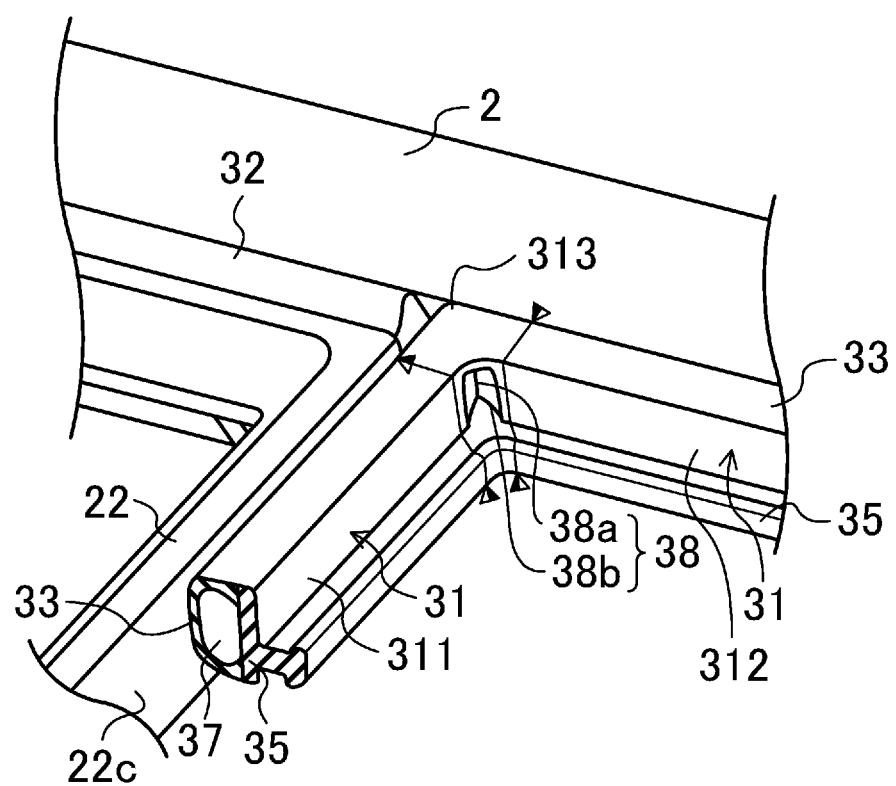
FIG. 7 is a perspective view schematically illustrating the appearance of a portion of a weatherstrip located at a rear corner of the front panel and a portion of a panel frame located at a front corner of the rear panel.
Figure 8:
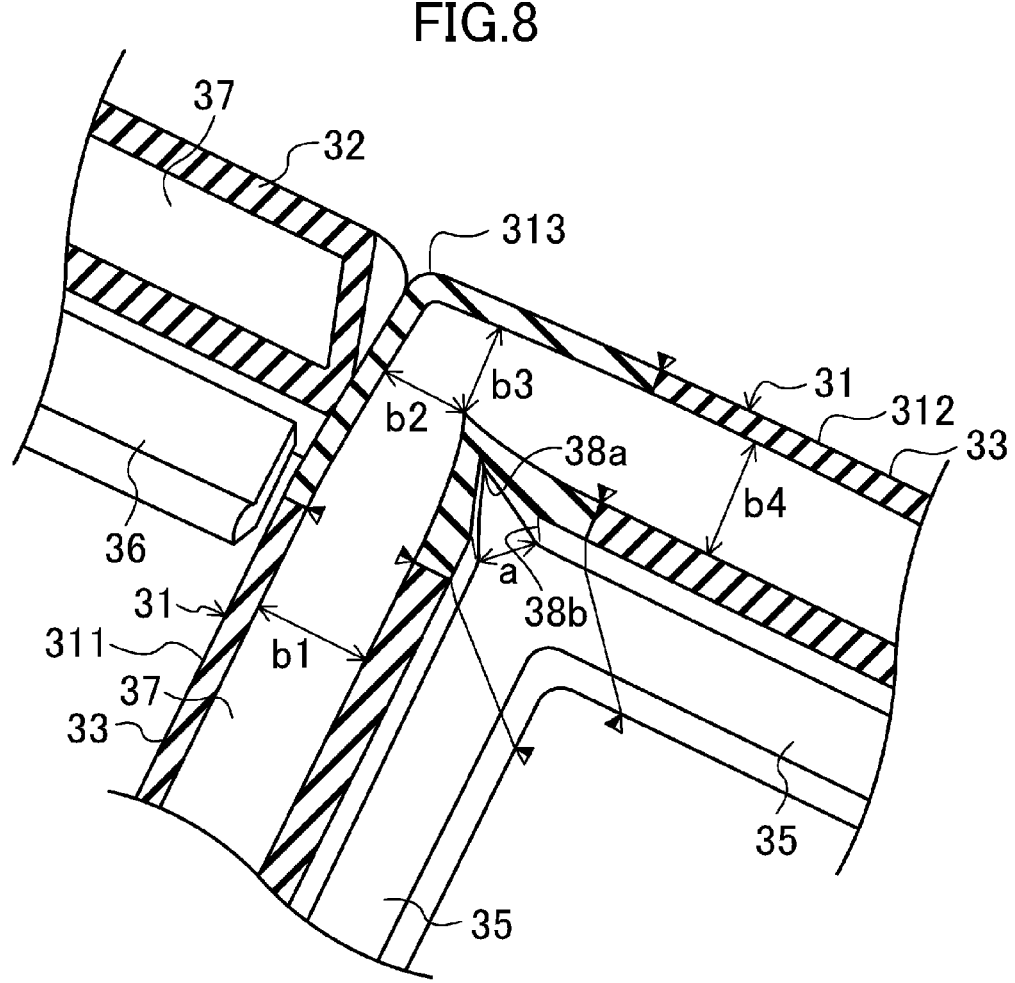
FIG. 8 is a partially cutout perspective view of a portion of the weatherstrip located at a rear corner of the front panel and a portion of a weatherstrip located at a front corner of the rear panel.

More specifically, as illustrated in FIGS. 7 and 8, the rear portion 311 and the side portion 312 are joined to the corner portions 313. In FIGS. 7 and 8, the boundaries between the rear portion 311, the side portion 312, and the corner portion 313 are indicated by vertexes of the black-and-white triangles. The black half of each triangle is directed to the corner portion 313, and the white half of each triangle is directed to the rear portion 311 or the side portion 312. The rear portion 311 and the side portion 312 are extrusion molded parts whereas each corner portion 313 is molding produced by injection molding or transfer molding. For example, the corner portion 313 is made of a soft synthetic rubber material (e.g., a sponge material).

As illustrated in FIG. 8, the recess 38 is located on an inner side of the corner of the corner portion 313. Thus, walls of the corner portion 313 which form the inner side of the corner are bent toward the inner space of the corner portion 313. Here, in the weatherstrip 31, the width of the inner space of the rear portion 311 is denoted by reference character b1, the width of the inner space of the side portion 312 is denoted by reference character b4, the width in the front-and-rear direction at the vertex of the inner corner of the corner portion 313 is denoted by reference character b2, and the width in the lateral direction at the vertex of the inner corner of the corner portion 313 is denoted by reference character b3. Each of the widths b1 and b4 is larger than each of the widths b2 and b3. Thus, the following expression holds: b1=b4>b2=b3. Here, each of the widths is a dimension along a surface of the panel body and generally in the horizontal direction.

As illustrated in FIG. 8, the recess 38 has a width a which gradually decreases from an opening portion 38b to an inward portion 38a of the recess 38. Specifically, the recess 38 is defined by an upper wall, a lower wall which is parallel with the upper wall, and two sidewalls which are provided between the upper and lower walls. The spacing between the two sidewalls gradually narrows toward the inward portion 38a of the recess 38. That is, the recess 38 tapers down. Since the upper wall is parallel to the lower wall, the height (the vertical dimension) of the two sidewalls is substantially uniform from the opening portion 38b to the inward portion 38a. It might be possible to configure the recess 38 such that the spacing between the two sidewalls is substantially uniform from the opening portion 38b to the inward portion 38a. With this configuration, however, the width of the inner space of the weatherstrip 31 would decrease sharply from the width b1 to the width b2 or from the width b4 to the width b3. Such a sharp change in the width of the inner space of the weatherstrip 31 could cause the elasticity of the corner portion 313 to change sharply at the recess 38 and in the vicinity hereof, thereby reducing the sealing performance and marring the appearance. On the other hand, the recess 38 that tapers down with the spacing between the two sidewalls gradually narrowing can cause the width of the inner space of the weatherstrip 31 to change gradually from the width b1 to the width b2 or from the width b4 to the width b3. It is thus possible to cause the elasticity of the weatherstrip 31 to change gradually, particularly in the corner portions 313, and to improve the sealing performance and the appearance. This also makes it easy to allow the front panel 11 to have a substantially flush surface.

Figure 9:
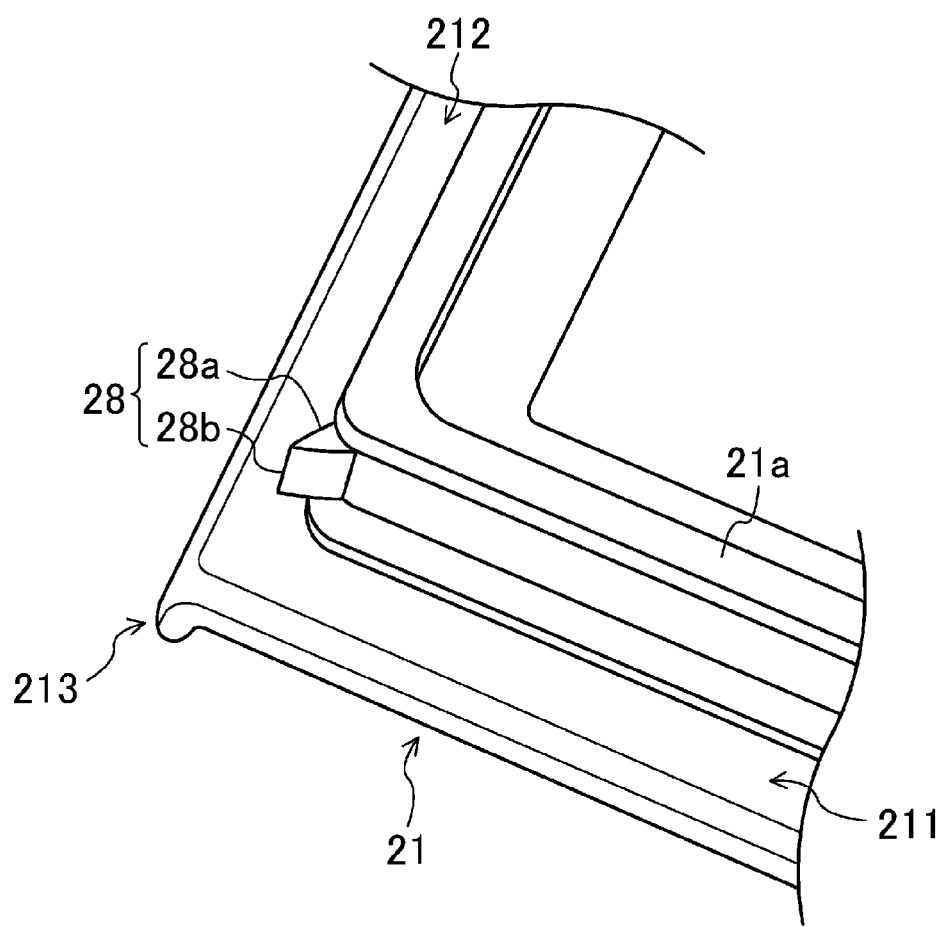
FIG. 9 is a perspective view of a portion of a panel frame located at a rear corner of the front panel.

As illustrated in FIG. 9, the shape of the engagement portion 28 corresponds to that of the recess 38. Specifically, an upper wall, a lower wall which is parallel with the upper wall, and two sidewalls which are provided between the upper and lower walls form the engaging portion 28. The distance between the two sidewalls gradually decreases from a base end 28a to a tip end 28b. Thus, the engagement portion 28 tapers down, i.e. is in a wedge shape. In like manner with the height of the recess 38, the height of the engagement portion 28 is substantially uniform from the base end 28a to the tip end 28b. This enables the engagement portion 28 and the recess 38 to have a large contact area.

The engagement portion 28 of which the width of the tip end is smaller than that of the base end enables easy insertion of the engagement portion 28 into the recess 38 when the weatherstrip 31 is attached. Further, the engagement portion 28 with the width gradually decreasing from the base end to the tip end enables smoother insertion of the engagement portion 28 into the recess 38.

Regarding the boundaries between the rear portion 311, the side portion 312, and the corner portion 313 illustrated in FIGS. 7 and 8, the boundary planes extending across the sealing portions 33 and 33 are substantially perpendicular to the longitudinal direction of the weatherstrip 31. On the other hand, the boundary planes extending across the engagement portions 35 and 35 are oblique with respect to the longitudinal direction of the weatherstrip 31. More specifically, the boundary planes extending across the engagement portions 35 and 35 are oblique to prevent the engagement portion 35 of the rear portion 311 and the engagement portion 35 of the side portion 312 from interfering with each other. For example, the mutual interference of the engagement portions 35 of the rear portion 311 and the side portion 312 might be prevented by increasing the corner portion 313 in size to make larger the spacing between the end of the rear portion 311 and the end of the side portion 312. However, since the corner portion 313 has relatively low rigidity (for example, the corner portion 313 is made of a sponge material), an increase of the proportion that the corner portion 313 constitutes in the weatherstrip 31 could result in a decrease of the rigidity of the weatherstrip 31, and thereby could make displacement and misalignment of the corner portion 313 likely to occur. On the other hand, the configuration in which the engagement portions 35 and 35 have end surfaces oblique with respect to the longitudinal direction of the weatherstrip 31 can prevent the mutual interference of the engagement portion 35 of the rear portion 311 and the engagement portion 35 of the side portion 312. In addition, this configuration allows the end of the rear portion 311 and the end of the side portion 312 to be positioned close to each other, and accordingly, enables reduction of the size of the corner portion 313. As a result, it is possible to achieve a configuration in which the rear portion 311 and the side portions 312 that have relatively high rigidity constitute a large proportion of the weatherstrip 31, and the corner portions 313 that have relatively low rigidity constitute a small proportion of the weatherstrip 31. Thus, displacement and misalignment of the corner portions 313 can be further reduced.

The above-described configuration can reduce displacement and misalignment of the corner portions 313 of the weatherstrip 31.

Specifically, the configuration in which the weatherstrip 31 that is hollow is attached to the panel frame 21 made of a rigid resin material may have the following undesirable feature. Since the weatherstrip 31 is likely to be deformed, stretch and contraction, or a dimensional error of the weatherstrip 31 may cause not only misalignment when the weatherstrip 31 is attached to the panel frame 21, but also displacement of the weatherstrip 31 from the panel frame 21 when they are in use.

To overcome this undesirable feature, the engagement portion 28 formed on each corner portion 213 of the panel frame 21 is engaged with the recess 38 formed in each corner portion 313 of the weatherstrip 31. This engagement can reduce misalignment between the weatherstrip 31 and the panel frame 21 when the weatherstrip 31 is attached to the panel frame 21. This engagement can also reduce displacement of the weatherstrip 31 from the panel frame 21 when they are in use. In addition, engaging the engagement portion 28 with the recess 38 to attach weatherstrip 31 renders positioning of the weatherstrip 31 easy, thereby enabling quick attachment of the weatherstrip 31.

Since the misalignment and displacement of the weatherstrip 31 from the panel frame 21 can be reduced in the above manner, it is possible to employ the weatherstrip 31 including therein the hollow space. Consequently, when the opening 3 is closed, the weatherstrip 31 is sufficiently elastically deformed, and sealing between the weatherstrip 31 and the fixed roof 2 can be ensured. Since the weatherstrip 31 includes the follow space in all of the portions and no solid portion needs to be formed, the manufacturing method of the weatherstrip 31 can be simplified and the manufacturing costs can be reduced.

At the contact portion between the front panel 11 and the rear panel 12, the weatherstrip 31 having therein the hollow elastic portion 37 is in contact with the panel frame 22 that is more rigid than the weatherstrip 31, which can ensure high sealing performance.

Further, in the rear panel 12, the portion that is configured to contact the weatherstrip 31 of the front panel 11 is provided not with a weatherstrip which is solid, i.e., highly rigid, but with the panel frame 22. It is thus easy to allow the portion of the rear panel 12 that is configured to contact the weatherstrip 31 of the front panel 11 to have rigidity higher than that of the weatherstrip 31. That is, it is unnecessary to cause the weatherstrip 32 of the rear panel 12 to include both of a solid structure and a hollow structure. Consequently, manufacturing costs of the weatherstrip 32 can be reduced.

In addition, since each corner portion 313 is made of a sponge material, the engagement portion 28 made of a rigid resin material is easily engaged with the recess 38 without gaps, thereby enabling further reduction of the displacements and misalignment.

The recess 38 is formed when the corner portion 313 is molded. The rear portion 311 and each side portion 312 are joined to the corresponding corner portion 313 at the same time as the molding of the corner portion 313. Therefore, number of steps of manufacturing the weatherstrip 31 is not increased unnecessarily, and accordingly, reduction in productivity can be prevented. It is thus possible to produce the weatherstrips 31 in volume at low costs.

Further, it is generally required for a rubber weatherstrip to be detachable from a panel body for replacement. If the weatherstrip is configured to be directly attached to a panel body, the weatherstrip is necessarily attached to the panel body in such a manner that portions of the weatherstrip sandwich an edge of the panel body in the vertical direction. Thus, with this configuration, it is difficult to cause the panel to have a substantially flush surface. To address this, the panel frames 21 and 22 each made of a rigid resin material are attached to the peripheral edges of the panel bodies of the front panel 11 and the rear panel 12, respectively, and the weatherstrips 31 and 32 are attached to the panel frames 21 and 22, respectively. It is thus possible to cause each of the front panel 11 and the rear panel 12 to have a substantially flush surface.

When the opening 3 is in the closed state, the rear portion 311 of the weatherstrip 31 is in contact with the front portion 221 of the panel frame 22 and the front end surfaces of the weatherstrip 32. Here, at least part of each front end surface of the weatherstrip 32 is located rearward of the front portion 221 of the panel frame 22. This ensures a space into which the rear portion 311 of the weatherstrip 31 can expand when it is deformed. Specifically, a front end surface 22c of the front portion 221 of the panel frame 22 is a flat plane extending in vertical and lateral directions (i.e., a flat plane of which the normal line extends toward the front). On the other hand, each front end surface of the weatherstrip 32 is oblique such that a portion which is located more upper in the vertical direction and more outside in the lateral direction is nearer the rear (see FIGS. 7 and 8). That is, at least an upper portion of each front end surface of the weatherstrip 32 is located rearward of the front end surface 22c of the panel frame 22. Thus, a space which extends rearward with respect to the front end surface 22c is formed in front of each front end surface of the weatherstrip 32. When the weatherstrip 31 is in contact with the front end surface 22c of the panel frame 22, the rear portion 311 is elastically deformed. A portion of the weatherstrip 31 which faces the corresponding front end surface of the weatherstrip 32 (specifically, a portion of the corner portion 313 which is continuous with the rear portion 311) is deformed to expand in the space formed in front of the corresponding front end surface. The space in front of each front end surface of the weatherstrip 32 functions as a space where deformation of the weatherstrip 31 is relieved. In this manner, when the weatherstrip 31 is deformed, upward bulge of the weatherstrip 31 can be reduced, and accordingly, the appearance of the sunroof apparatus 10 can be aesthetically improved. For example, when the sunroof apparatus 10 is viewed from a side, the side portion 312 of the weatherstrip 31 and the weatherstrip 32 extend in a substantially straight line, and the contact portion between the rear portion 311 of the weatherstrip 31 and the front portion 221 of the panel frame 22 extends in a substantially straight line.

Each front end surface of the weatherstrip 32 is oblique, and not entirely located rearward of the front end surface 22c of the panel frame 22. Accordingly, the weatherstrip 31 is in contact with at least part of each front end surface of the weatherstrip 32, thereby ensuring the sealing performance. In addition, the portion of the weatherstrip 31 facing each front end surface of the weatherstrip 32 is deformed to expand into the space in front of each front end surface, and consequently, the contact area of the weatherstrip 31 and each front end surface is increased, thereby ensuring the sealing performance.

Although with the above configuration in which each corner portion 313 of the weatherstrip 31 is deformed more than the other portions when the opening 3 is closed, the engagement between the recess 38 of each corner portion 313 and the corresponding engagement portion 28 of the panel frame 21 prevents the displacement and misalignment of each corner portion 313.

In each corner portion 313 of the weatherstrip 31, a portion which is continuous with the side portion 312 is configured to abut on the fixed roof 2 whereas a portion which is continuous with the rear portion 311 is configured to abut on the corresponding front end surface of the weatherstrip 32. Accordingly, the direction in which the engagement portion 28 projects may be set such that, in respect of the widths of the inner space of the weatherstrip 31, the following expression holds: b1=b4>b2≤b3. For example, the direction may be set such that the angle formed by the engagement portion 28 and the rear portion 211 is smaller than the angle formed by the engagement portion 28 and the side portion 212. Alternatively, the engagement portion 28 may be provided at a laterally inner point with respect to the vertex of the corner formed by the rear portion 211 and the side portion 212, or the engagement portion 28 provided at the laterally inner point may be caused to project in the direction set as described above. With the engagement portions 28 thus provided, in the inner space of each corner portion 313, the width b3 of a portion which is continuous with the side portion 312 is large, and consequently, the portion continuous with the side portion 312 can be more flexibly deformed than a portion of each corner portion 313 which is continuous with the rear portion 311. Since the fixed roof 2, which the portion continuous with the side portion 312 is configured to contact, is hardly deformed, designing the portion continuous with the side portion 312 to be easily deformed can ensure the sealing performance of the weatherstrip 31 and make it easy to buffer an assembly error. On the other hand, since each front end surface of the weatherstrip 32, which the portion of each corner portion 313 continuous with the rear portion 311 is configured to contact, is easily deformed, the deformation of both of the portion continuous with the rear portion 311 and the weatherstrip 32 ensures the sealing performance of the weatherstrip 31 and buffers an assembly error.

Since the front panel 11 of the sunroof apparatus 10 is configured to be tilted up to slide, when the opening 3 is in an open state, the front panel 11 is exposed to and seen from the outside of the vehicle. The weatherstrip 31 extending on the entire periphery of the front panel 11 prevents the appearance of the whole front panel 11 from being less attractive.

The weatherstrip 32 may be attached to the panel frame 22 of the rear panel 12 in a manner as described in Japanese Unexamined Patent Publication No. 2010-95129, for example.

OTHER EMBODIMENTS

The embodiment has been described as example techniques disclosed in the present application. However, the techniques according to the present disclosure are not limited to the embodiment, but are also applicable to embodiments where modifications, substitutions, additions, and omissions are made. In addition, elements described in the embodiment may be combined to provide a different embodiment. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

The foregoing embodiment may have the following configuration.

Each front end surface of the weatherstrip 32 is not limited to the oblique plane. For example, in a manner similar to Japanese Unexamined Patent Publication No. 2010-95129, a recess may be formed in each front end surface such that the recess receives the corner portion 313 of the weatherstrip 31 when the corner portion 313 is deformed.

The foregoing embodiment is configured such that the weatherstrip 31 extends on all of the peripheral edges of the front panel 11 whereas the weatherstrip 32 extends on the periphery of the rear panel 12 except the edge portion configured to contact the front panel 11, and the portion of the panel frame 22 located in the edge portion is exposed and caused to face and contact the weatherstrip 31. This configuration may be reversed. Specifically, the weatherstrip 32 may extend on all of the peripheral edges of the rear panel 12 whereas the weatherstrip 31 may extend on the front panel 11 except an edge portion configured to contact the rear panel 12, and a portion of the panel frame 21 located in the edge portion may be exposed and caused to face and contact the weatherstrip 32.

The front panel 11 is configured to be tilted up to slide, and the rear panel 12 is configured to be tilted down to slide in the foregoing embodiment. However, the sunroof apparatus may be configured such that one of the front panel 11 or the rear panel 12 is fixed and the other is movable. For example, the front panel 11 may be configured to be tilted up to slide and the rear panel 12 may be fixed.

The sunroof apparatus 10 is not limited to the twin panel type. The sunroof apparatus may include three or more panels, provided that such panels have the relation between the front panel 11 and the rear panel 12.

The engagement portions 28 and the recesses 38 are not limited to the above-described shapes as long as they are capable of reducing the displacement and misalignment of the weatherstrip 31. For example, the two side faces of each engagement portion 28 may be curved and concave toward the inside. In each engagement portion 28 thus configured, the width sharply decreases from the base end 28a toward the tip end 28b and the intermediate portion between the base end 28a and the tip end 28b has a smaller width. In accordance with the shape of the engagement portion 28, the intermediate portion of the recess 38 between the opening portion 38b and the inward portion 38a may have a smaller width. In this manner, portions of the inner space of the weatherstrip 31 which correspond to the opening portion 38b and the intermediate portion of the recess 38 can have a larger width. It is thus possible to keep the width of the inner space of the weatherstrip 31 that unavoidably narrows toward the corner vertex of the corner portion 313 from narrowing as much as possible. As a result, the sealing performance and the appearance of the front panel 11 can be further improved. Note that the distance between the two walls of each engagement portion 28 and the distance between the two walls of each recess 38 may be substantially uniform.

Furthermore, each engagement portion 28 and each recess 38 do not necessarily have to be in a similar shape. For example, each engagement portion 28 and each recess 38 may be in different shapes if the softer one of them is deformed to be engaged with the other.

What is claimed is:

1. A sunroof apparatus comprising a front panel and a rear panel configured to contact each other at edge portions of the panels to close an opening in a fixed roof, wherein
    the front panel includes a panel body, a panel frame extending on a peripheral edge of the panel body, and a weatherstrip extending on the panel frame,
    the rear panel includes a panel body, a panel frame extending on a peripheral edge of the panel body, and a weatherstrip extending on the panel frame,
    the weatherstrip of one of the front and rear panels is hollow and extends on all of a peripheral edge of the corresponding panel frame,
    the panel frame of the other one of the front and rear panels has a portion which faces the one of the front and rear panels and on which the weatherstrip is absent,
    when the front panel and the rear panel have closed the opening, the weatherstrip of the one of the front and rear panels is in contact with the panel frame of the other one of the front and rear panels,
    a corner portion of the panel frame of the one of the front and rear panels has an engagement portion projecting outward, and
    a corner portion of the weatherstrip of the one of the front and rear panels corresponds to the corner portion of the panel frame and has a recess in a non-engaged state with which the engagement portion is capable of engaging.

2. The sunroof apparatus of claim 1, wherein
    a width of a tip end of the engagement portion is smaller than that of a base end of the engagement portion.

3. The sunroof apparatus of claim 2, wherein
    the width of the engagement portion gradually decreases from the base end toward the tip end, and
    the recess is in a shape corresponding to the engagement portion.

4. The sunroof apparatus of claim 1, wherein
    the weatherstrip of the one of the front and rear panels includes a first linear portion joined to an end of the corner portion and configured to contact the panel frame of the other one of the front and rear panels, and a second linear portion joined to the other end of the corner portion and configured to contact an edge of the opening, and
    a width of an inner space of the corner portion is smaller than a width of an inner space of each of the first and second linear portions because of presence of the recess in the inner space of the corner portion.

5. The sunroof apparatus of claim 1, wherein
    the weatherstrip of the one of the front and rear panels includes a first linear portion joined to an end of the corner portion and configured to contact the panel frame of the other one of the front and rear panels, and a second linear portion joined to the other end of the corner portion and configured to contact an edge of the opening, and
    the first linear portion and the second linear portion are extrusion molded parts and each joined to a corresponding one of the ends of the corner portion at the same time as molding of the corner portion.

* * * * *